United States Patent
Saito et al.

(10) Patent No.: US 8,309,483 B2
(45) Date of Patent: Nov. 13, 2012

(54) BINDER FOR MONOLITHIC REFRACTORIES AND MONOLITHIC REFRACTORY

(75) Inventors: Yoshitoshi Saito, Tokyo (JP); Atsunori Koyama, Omuta (JP)

(73) Assignees: Nippon Steel Corporation, Tokyo (JP); Denki Kagaku Kogyo Kabushiki Kaisha, Tokyo (JP)

( * ) Notice: Subject to any disclaimer, the term of this patent is extended or adjusted under 35 U.S.C. 154(b) by 28 days.

(21) Appl. No.: 12/736,607

(22) PCT Filed: Oct. 27, 2008

(86) PCT No.: PCT/JP2008/069838
§ 371 (c)(1),
(2), (4) Date: Oct. 21, 2010

(87) PCT Pub. No.: WO2009/130811
PCT Pub. Date: Oct. 29, 2009

(65) Prior Publication Data
US 2011/0039683 A1     Feb. 17, 2011

(30) Foreign Application Priority Data
Apr. 25, 2008  (JP) .................................. 2008-115533

(51) Int. Cl.
*C04B 35/03* (2006.01)
*C04B 7/32* (2006.01)
(52) U.S. Cl. .................... 501/124; 501/125; 106/692
(58) Field of Classification Search .................. 501/124, 501/125; 106/692, 693, 694, 695
See application file for complete search history.

(56) References Cited

U.S. PATENT DOCUMENTS

| | | | | |
|---|---|---|---|---|
| 2,445,052 A * | 7/1948 | Zimmerman | ................ | 106/638 |
| 3,963,508 A * | 6/1976 | Masaryk | ....................... | 106/693 |
| 4,204,878 A | 5/1980 | Nudelman et al. | | |
| 7,459,409 B2 | 12/2008 | Kiyota | | |
| 2004/0206272 A1 * | 10/2004 | Hermansson et al. | .......... | 106/35 |
| 2004/0206273 A1 * | 10/2004 | Hermansson et al. | .......... | 106/35 |
| 2011/0251045 A1 * | 10/2011 | Saito et al. | .................... | 501/125 |

FOREIGN PATENT DOCUMENTS

| | | |
|---|---|---|
| EP | 1 650 164 A1 | 4/2006 |
| JP | 52-148524 | 12/1977 |
| JP | 53-025631 | 3/1978 |
| JP | 56-104783 | 8/1981 |
| JP | 58-26079 | 2/1983 |
| KR | 1020060024247 | 3/2006 |
| KR | 1020060048636 | 5/2006 |

OTHER PUBLICATIONS

European Search Report dated Dec. 15, 2011 issued in corresponding European Application No. 08874061.8.

(Continued)

*Primary Examiner* — Karl Group
(74) *Attorney, Agent, or Firm* — Kenyon & Kenyon LLP

(57) ABSTRACT

A binder for monolithic refractories characterized by containing ingredients comprised of a chemical composition of at least one of $Ca_xSr_{1-x}Al_2O_4$, and $Ca_ySr_{1-y}Al_4O_7$ or these plus $12(CaO)_z(SrO)_{1-z}\cdot 7Al_2O_3$ (where, $0<x<1$, $0<y<1$, and $0<z<1$) and a binder for monolithic refractories and monolithic refractories superior in erosion resistance to slag or molten iron by monolithic refractories comprised of this binder and refractory aggregates are provided.

6 Claims, 3 Drawing Sheets

OTHER PUBLICATIONS

Elmer T. Carlson: "A Study of Some Strontium Aluminates and Calcium-Strontium Aluminate Solid Solutions", Journal of Research of the National Bureau of Standards, vol. 54, No. 6, 2595, Jun. 1, 1955, pp. 329-334, (1955-86-81), XP889152919.

King W. A. et al: "Strontium Calcium Aluminate Glasses", Physics and Chemistry of Glasses, vol. 37, No. 1, Feb. 1, 1996 (1996-82-81), pp. 1-03, XP888555971, Society of Glass Technology, Sheffield, GB, ISSN: 8831-9898.

Prodjosantoso and B. J. Kennedy A. K.: "Synthesis and Evolution of the Crystalline Phases in Ca1-xSrxA1204", Journal of Solid State Chemistry, vol. 168, No. 1, Jul. 16, 2002, pp. 229-236, XP008143417, Orlando, FL, US, ISSN: 0022-4596, DOI: 10.1006/JSSC.2002.9715.

Ito: Journal of the Ceramic Society of Japan, vol. 89, No. 10, Sep. 19, 2006, pp. 572-577, XP002661041.

International Search Report dated Feb. 10, 2009 issued in corresponding PCT Application No. PCT/JP2008/069838.

Prodjosantoso, A.K. et al., "Synthesis and Evolution of the Crystalline Phases in $Ca_{1-x}Sr_xAl_2O_4$", Journal of Solid State Chemistry, 2002, vol. 168, No. 1, pp. 229-236.

Ito et al "Strength of the Hardened Mortars of Sr-substituted $CaAl_2O_4$-type Solid Solution" The Ceramic Society of Japan, Yogyo-Kyokai-Shi, 89 [10] 1981, pp. 572-577.

* cited by examiner

US 8,309,483 B2

BINDER FOR MONOLITHIC REFRACTORIES AND MONOLITHIC REFRACTORY

This application is a national stage application of International Application No. PCT/JP2008/069838, filed 27 Oct. 2008, which claims priority to Japanese Application No. 2008-115533, filed 25 Apr. 2008, which is incorporated by reference in its entirety.

TECHNICAL FIELD

The present invention relates to a binder used for monolithic refractories used for lining or repairing an industrial kiln and to such a monolithic refractory.

BACKGROUND ART

For the binder for refractories for the inner liners of industrial kilns of various high temperature processes such as the steelmaking process, sodium phosphate, sodium silicate, furan resin, phenol resin, pitch, aluminum lactate, sodium aluminate, silica sol, alumina sol, polyvinyl alcohol, methyl cellulose, carboxymethyl cellulose, ethyl silicate, alumina cement, hydraulic alumina, and numerous other inorganic and organic compounds are being used.

In recent years, in the field of refractories, due to improvements in installation ability, ease of repair, etc., increased use is being made of monolithic refractories. Monolithic refractories are now being widely used even at locations contacting molten iron or high temperature slag where shaped bricks were previously used.

In the production of monolithic refractories, high pressure press operations such as seen in the production of shaped refractories are not performed. Therefore, the importance of the characteristics of the material or binders is high. Among these, alumina cement (main constituent compound: $CaO.Al_2O_3$, $CaO.2Al_2O_3$, $12CaO.7Al_2O_3$) is being used for broad applications as a binder for refractories for troughs, ladles, tundishes, etc.

Furthermore, alumina-type binders including ingredients other than $CaO$—$Al_2O_3$ are also being studied. For example, Japanese Patent Publication (A) No. 52-148524 and Japanese Patent Publication (A) No. 58-26079 disclose a mixture of materials for producing refractory alumina cement mainly comprised of barium or strontium and alumina. Specifically, by suitably heat treating a mixture of carbonates and chlorates, a mixture of materials for producing cement is obtained.

Further, the *Journal of the Ceramic Society of Japan* (89, 10, 572-577, 1981, Ito et al.) discloses to add to a CaO—SrO—$Al_2O_3$-based cement a commercially available high purity reagent and to mix and fire the same to prepare a prototype binder and shows the property of hardening by the addition of water.

DISCLOSURE OF INVENTION

The problems to be solved by the present invention are as follows:

At the present time, improvements in the quality of steel are being sought. The temperature and other conditions of operations are therefore becoming stricter. On the other hand, with conventional binders, the high temperature erosion resistance etc. are becoming insufficient. The generally used alumina cement and other binders more easily form iron oxides and low temperature substances in the molten iron and slag compared with the refractory aggregate ingredients forming the monolithic refractories. At the binder parts, there is therefore increasing erosion loss or infiltration of the refractories and therefore the problem of the inability of sufficiently making use of the inherent durability of the refractory aggregate ingredients.

In this regard, in Japanese Patent Publication (A) No. 52-148524, a mixture of material for producing a refractory alumina cement mainly comprised of barium or strontium and alumina is provided. The strength etc. of clinker-hydraulic materials have been investigated, but the compression strength was not sufficiently exhibited 3 days and 7 days after production. The maximum strength was finally exhibited after 28 days.

However, in ordinary monolithic refractories, often, after one day, the refractories are dried and raised in temperature and are exposed to the usage environment. The maximum strength has to be exhibited within 24 hours. For this reason, a binder which finally exhibits its maximum strength after 28 days cannot be used for monolithic refractories.

Further, the characteristics at a high temperature of over 1000° C. are not disclosed at all. Further, the erosion resistance to high temperature molten iron or slag is not clear. Means for application to monolithic refractories superior in erosion resistance at a high temperature are not shown at all.

Further, in Japanese Patent Publication (A) No. 58-26079, a heat insulating castable mixture using strontium aluminate as a binder is provided. While a heat insulating material having strength at a high temperature is obtained, this is for heat insulating applications of linings on the back surfaces of industrial kilns, so the erosion resistance to high temperature molten iron or slag, a characteristic essential for wear lining of industrial kilns, is unclear. Further, when using strontium aluminate as a binder, the strontium ions easily are eluted during the kneading, so aggregation easily occurs due to this. It became clear that kneading a heat insulating castable using strontium aluminate as a binder is not easy.

Further, the *Journal of the Ceramic Society of Japan* (89, 10, 572-577, 1981, Ito et al.) shows that CaO—SrO—$Al_2O_3$-based cement has been produced as a prototype and that the strength of the hardened body with an amount of 0.3 to 0.4 mol Sr substitution becomes extremely large, but the characteristics at a high temperature of over 1000° C. are not disclosed at all. Again, the means for application to monolithic refractories superior in erosion resistance at a high temperature are not shown at all.

Due to the above restrictions, the actually industrially used binder for monolithic refractories is currently alumina cement comprised mainly of $CaO.Al_2O_3$ and having $\alpha$-$Al_2O_3$, $CaO.2Al_2O_3$, $12CaO.7Al_2O_3$, and various other additives.

By way of reference, at the present, as the alumina cement used for a binder for monolithic refractories, for example, products made by Denka named "High Alumina Cement ES", "High Alumina Cement VS-2", "High Alumina Cement Super 90", "High Alumina Cement Super G", "High Alumina Cement Super 2", "High Alumina Cement Super", etc. and products made by Lafarge named "Secar 71", "Secar 80", etc. may be mentioned, but all of these are mainly comprised of $CaO.Al_2O_3$ and $\alpha$-$Al_2O_3$ or $CaO.2Al_2O_3$, $12CaO.7Al_2O_3$ and have small amounts of additives blended in according with the properties.

Therefore, to match with the increasingly severe temperature and other conditions of the operation, development of a binder for monolithic refractories superior in erosion resistance to high temperature molten iron or slag has been strongly desired.

The present invention has as its object the provision of a binder for monolithic refractories superior in erosion resistance to slag and molten iron and superior in installation ability and high temperature stability compared with conventional alumina cement and a monolithic refractory using the same.

The gist of the present invention is as follows.

(1) Binder for monolithic refractories characterized by containing an ingredient comprised of the chemical composition of $Ca_xSr_{1-x}Al_2O_4$ (where, $0<x<1$).

(2) Binder for monolithic refractories as set forth in (1) characterized by containing $Ca_xSr_{1-x}Al_2O_4$ in 10 mass % to 60 mass % and having $Al_2O_3$ blended into it in 40 mass % to 90 mass % (where, $0<x<1$).

(3) Binder for monolithic refractories characterized by containing an ingredient comprised of the chemical composition of $Ca_ySr_{1-y}Al_4O_7$ (where, $0<y<1$).

(4) Binder for monolithic refractories as set forth in (3) characterized by containing $Ca_ySr_{1-y}Al_4O_7$ in 10 mass % to 70 mass % and having $Al_2O_3$ blended into it in 30 mass % to 90 mass % (where, $0<y<1$).

(5) Binder for monolithic refractories characterized in that the total content of $Ca_xSr_{1-x}Al_2O_4$ and $Ca_ySr_{1-y}Al_4O_7$ is 10 mass % to 60 mass % and in that $Al_2O_3$ is blended in 40 mass % to 90 mass % (where, $0<x<1$ and $0<y<1$).

(6) Binder for monolithic refractories characterized in that the total content of $Ca_xSr_{1-x}Al_2O_4$ and $12(CaO)_z(SrO)_{1-z}\cdot7Al_2O_3$ is 10 mass % to 60 mass % and in that $Al_2O_3$ is blended in 40 mass % to 90 mass % (where, $0<x<1$ and $0<z<1$).

(7) Binder for monolithic refractories characterized in that the total amount of $Ca_xSr_{1-x}Al_2O_4$, $Ca_ySr_{1-y}Al_4O_7$ and $12(CaO)_z(SrO)_{1-z}\cdot7Al_2O_3$ is 10 mass % to 60 mass % and in that $Al_2O_3$ is blended in 40 mass % to 90 mass % (where, $0<x<1$, $0<y<1$, and $0<z<1$).

(8) Monolithic refractory characterized by having a binder as set forth in any one of (1) to (7) and a refractory aggregate mixed in it.

(9) A monolithic refractory as set forth in (8), said monolithic refractory characterized by blending in a binder in 0.5 mass % to 10 mass % indexed to the total of the binder and the refractory aggregate as 100 mass %.

The effect obtained by the present invention is as follows: That is, the binder for monolithic refractories according to the present invention is superior in erosion resistance to slag or molten iron and exhibits the effect of extending the service life of monolithic refractories for inside linings of industrial kilns used at a high temperature.

BEST MODE FOR CARRYING OUT THE INVENTION

Figure 1:
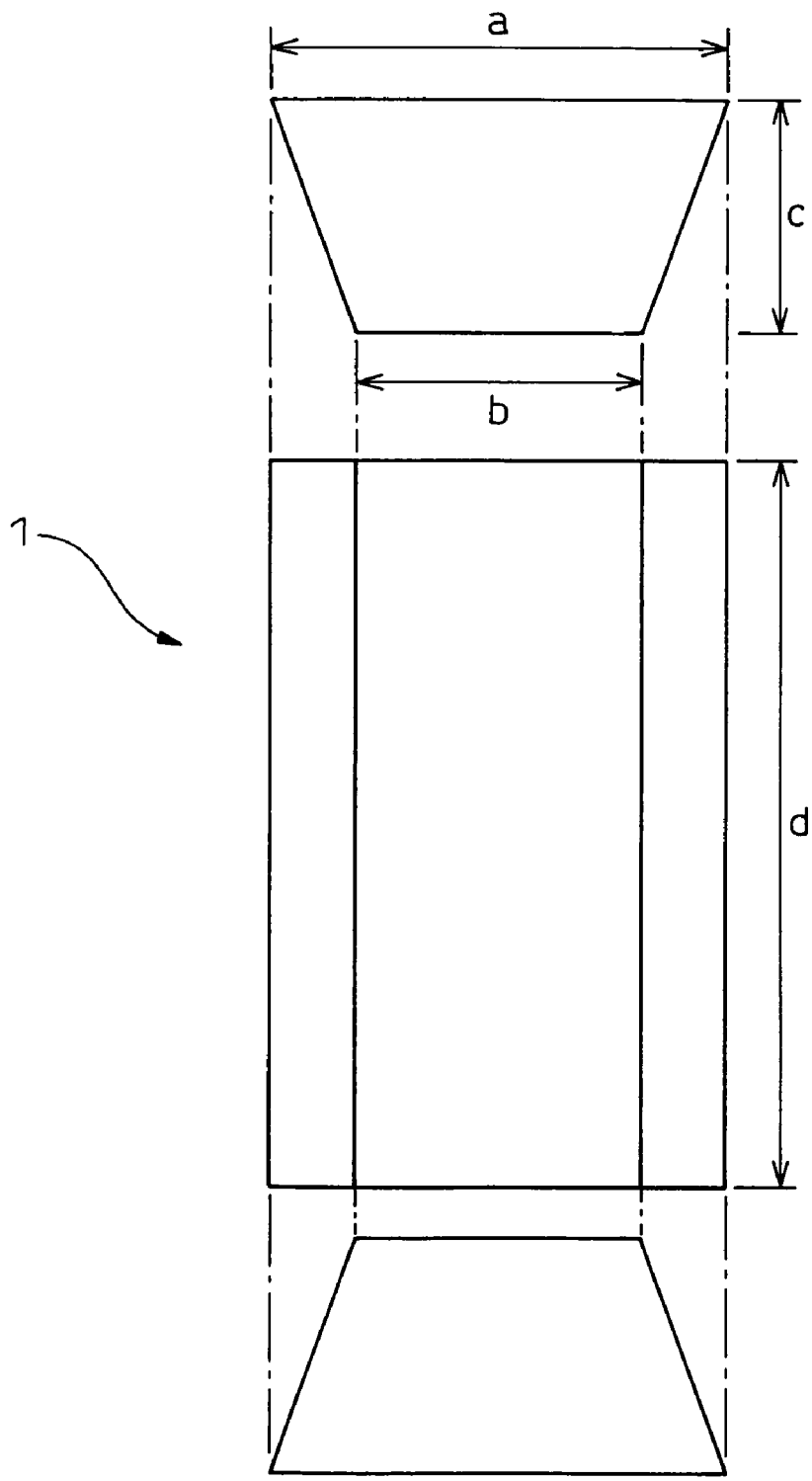
FIG. 1 is an explanatory view showing the shape of an evaluation sample.

The inventors took note of the replacement of the Ca in a binder for monolithic refractories with a metal element from the viewpoint of improving the refractoriness of monolithic refractories and newly discovered that by making SrO form a solid solution in conventional alumina cement $CaO\cdot Al_2O_3$, it is possible to obtain superior erosion resistance to slag or molten iron and improved installation ability and high temperature stability.

Note that "solid solution" indicates the state where two or more types of elements (metal or nonmetal possible) dissolve into each other and form a uniform solid phase as a whole. Due to the solid solution, the crystal structure does not change. This will be explained in detail below.

(1) of the present invention is a binder for monolithic refractories containing ingredients of the solid solution with a chemical composition expressed by $Ca_xSr_{1-x}Al_2O_4$ obtained by making SrO form a solid solution in conventional alumina cement $CaO\cdot Al_2O_3$.

The inventors newly discovered that this solid solution has a hydraulic property, has a higher melting point than conventional alumina cement $CaO\cdot Al_2O_3$, and is superior in high temperature stability when reacting with water to form a hardened object.

Here, as the range of "x" of $Ca_xSr_{1-x}Al_2O_4$, if a range of $0<x<1$, any value is possible. That is, it is sufficient that the state be one where SrO forms a solid solution. By forming such a solid solution, the melting point becomes higher than conventional alumina cement, the high temperature stability at the time when reacting with water to form a hardened object becomes superior, and the erosion resistance with respect to high temperature molten iron or slag becomes superior.

The binder of the present invention need only include ingredients comprised of the chemical composition of $Ca_xSr_{1-x}Al_2O_4$. The content of the $Ca_xSr_{1-x}Al_2O_4$ is not particularly defined. However, to enable this effect to be easily exhibited, the content of the $Ca_xSr_{1-x}Al_2O_4$ is preferably 10 mass % or more. Further, the higher the content, the better, so the upper limit may be 100 mass %.

When the binder has a balance other than $Ca_xSr_{1-x}Al_2O_4$, as the composition of the balance, $Al_2O_3$ is typical, but in addition, $SiO_2$, $TiO_2$, $Fe_2O_3$, MgO, etc. may be mentioned.

(2) of the present invention is preferably a binder in which $Al_2O_3$ is blended when a higher strength or refractoriness of the hardened object is required when $Ca_xSr_{1-x}Al_2O_4$ reacts with water to form a hardened object. The content in the binder is a $Ca_xSr_{1-x}Al_2O_4$ of 10 mass % to 60 mass % and blended $Al_2O_3$ of 40 mass % to 90 mass %.

If the content of the $Ca_xSr_{1-x}Al_2O_4$ is less than 10 mass %, due to the ingredients and particle size distribution of the refractory aggregate of the monolithic refractories, a sufficient hardened strength sometimes becomes difficult to obtain.

On the other hand, if over 60 mass %, due to the ingredients and particle size distribution of the refractory aggregate of the monolithic refractories, the hardening rate sometimes becomes too fast and sufficient usage time for installation becomes hard to secure.

Further, with the amount of the $Al_2O_3$ blended is 40 mass % or more, it is possible to sufficiently raise the strength and refractoriness of the hardened object, so this is preferable. However, even if over 90 mass % is blended, the content of the $Ca_xSr_{1-x}Al_2O_4$ becomes relatively smaller, so uniform hardening sometimes becomes difficult. Therefore, 90 mass % or less is preferable.

As the refractory aggregate for the monolithic refractory, fused alumina, fused bauxite, sintered alumina, calcined alumina, fused mullite, synthetic mullite, fused silica, fused zirconia, fused zirconia mullite, zircon, magnesia clinker, fused magnesia, fused chrome-magnesia, sintered spinel, fused spinel, silicon carbide, flake graphite, amorphous graphite, sillimanite, kyanite, and alucite, pyrophyllite, shale, dolomite clinker, siliceous stone, etc. may be used. One of these types or a combination of two or more of these types may be used.

(3) of the present invention is a binder for monolithic refractories containing the ingredients of a solid solution of a chemical composition expressed by $Ca_ySr_{1-y}Al_4O_7$ obtained by making SrO form a solid solution with the $CaO.Al_2O_3$ of the component compound of conventional alumina cement.

The inventors newly discovered that this solid solution, like the binder of the above (1), has a hydraulic property, has a melting point higher than the conventional alumina cement $CaO.Al_2O_3$, and is superior in high temperature stability when reacting with water to form a hardened object.

Here, as the range of "y" of $Ca_ySr_{1-y}Al_4O_7$, if a range of $0<y<1$, any value is possible. That is, it is sufficient that the state be one where SrO forms a solid solution. By forming such a solid solution, the melting point becomes higher than conventional alumina cement, the high temperature stability at the time when reacting with water to form a hardened object becomes superior, and the erosion resistance with respect to high temperature molten iron or slag becomes superior.

The binder of the present invention need only include ingredients comprised of the chemical composition of $Ca_ySr_{1-y}Al_4O_7$. The content of the $Ca_ySr_{1-y}Al_4O_7$ is not particularly defined. However, to enable this effect to be easily exhibited, the content of the $Ca_ySr_{1-y}Al_4O_7$ is preferably 10 mass % or more. Further, the higher the content, the better, so the upper limit may be 100 mass %.

When the binder has a balance other than $Ca_ySr_{1-y}Al_4O_7$, as the composition of the balance, ones similar to the case of the above binder (1) may be mentioned.

(4) of the present invention is preferably a binder in which $Al_2O_3$ is blended when a further increase in the strength and refractoriness of the hardened object is sought when the $Ca_ySr_{1-y}Al_4O_7$ reacts with water to form a hardened object. The suitable contents in the binder are a $Ca_ySr_{1-y}Al_4O_7$ of 10 mass % to 70 mass % and an amount of $Al_2O_3$ of 30 mass % to 90 mass %.

If the content of the $Ca_ySr_{1-y}Al_4O_7$ is less than 10 mass %, due to the ingredients and particle size distribution of the refractory aggregate of the monolithic refractories, a sufficient hardened strength sometimes becomes difficult to obtain.

On the other hand, if over 70 mass %, due to the ingredients and particle size distribution of the refractory aggregate of the monolithic refractories, the hardening rate sometimes becomes too fast and sufficient usage time for installation becomes hard to secure.

Further, when the amount of the $Al_2O_3$ blended is 30 mass % or more, it is possible to sufficiently raise the strength and refractoriness of the hardened object, so this is preferable. However, even if over 90 mass % is blended, the content of the $Ca_ySr_{1-y}Al_4O_7$ becomes relatively smaller, so uniform hardening sometimes becomes difficult. Therefore, 90 mass % or less is preferable.

(5) of the present invention is a binder comprised of a mixture of the binders of the above (1) and (3) into which $Al_2O_3$ is blended. The suitable contents in the binder are a total of the $Ca_xSr_{1-x}Al_2O_4$ and $Ca_ySr_{1-y}Al_4O_7$ of 10 mass % to 60 mass % and an amount of $Al_2O_3$ of 40 mass % to 90 mass %. Here, the mixing ratio of the above (1) and (3) may be made any ratio and is not particularly defined.

(6) of the present invention is a binder comprised of a mixture of the binder of the above (1) and the ingredients of the solid solution expressed by $12(CaO)_z(SrO)_{1-z}.7Al_2O_3$ into which $Al_2O_3$ is blended. The suitable contents in the binder are a total of the $Ca_xSr_{1-x}Al_2O_4$ and $12(CaO)_z(SrO)_{1-z}.7Al_2O_3$ of 10 mass% to 60 mass % and an amount of $Al_2O_3$ of 40 mass % to 90 mass %. Here, the mixing ratio of the binder of the above (1) and a binder of $12(CaO)_z(SrO)_{1-z}.7Al_2O_3$ may be made any ratio and is not particularly defined.

(7) of the present invention is a binder comprised of a mixture of the binders of the above (1) and (3) and the ingredients of the solid solution expressed by $12(CaO)_z(SrO)_{1-z}.7Al_2O_3$ into which $Al_2O_3$ is blended. The suitable contents in the binder are a total of $Ca_xSr_{1-x}Al_2O_4$, $Ca_ySr_{1-y}Al_4O_7$, and $12(CaO)_z(SrO)_{1-z}.7Al_2O_3$ of 10 mass % to 60 mass % and an amount of $Al_2O_3$ of 40 mass % to 90 mass %. Here, the mixing ratio of the binders of (1) and (3) and ingredients of $12(CaO)_z(SrO)_{1-z}.7Al_2O_3$ may be made any ratio and is not particularly defined.

When using a binder for monolithic refractories of the present invention to produce actual monolithic refractories, it is recommended that the mixing ratio of the binder and refractory aggregate be made one where the binder is 0.5 mass % to 10 mass % when indexed to the total of the binder and refractory aggregate as 100 mass %.

If less than 0.5 mass %, the binding is insufficient and the strength after hardening of the binder sometimes becomes insufficient.

Further, if over 10 mass %, the change in volume due to the hydration and dehydration process of the binder sometimes has an effect on the monolithic refractories as a whole and that cracks etc. sometimes form.

As the refractory aggregate for monolithic refractories, fused alumina, fused bauxite, sintered alumina, calcined alumina, fused mullite, synthetic mullite, fused silica, fused zirconia, fused zirconia mullite, zircon, chrome magnesia, fused magnesia, fused chrome magnesia, sintered spinel, fused spinel, silicon carbide, flake graphite, amorphous graphite, sillimanite, kyanite, andalucite, pyrophyllite, shale, dolomite clinker, siliceous stone, etc. may be used. One of these types or a combination of two or more of these types may be used.

When using the binder of the present invention for a binder for monolithic refractories, the amount of the water or aqueous solvent at the time of installation is not particularly defined. However, while depending also on the particle size distribution of the aggregate and the type or amount of the dispersant, generally about 2 to 10 mass % with respect to the refractory aggregate is suitable.

If less than 2 mass %, the hardening becomes harder. Further, if more than 10 mass %, the amount relating to the formation of a hardened structure becomes relatively high. The change in volume during the hardening reaction etc. easily has a detrimental effect on the quality of the refractory.

Further, when using the binder of the present invention for the binder for the monolithic refractories, it is preferable to add a dispersant or hardening adjuster for controlling the rate of the hydration and hardening reactions in accordance with the air temperature and humidity.

As dispersants, sodium carbonate, sodium hydrogen carbonate, citric acid, sodium citrate, tartaric acid, sodium tartarate, or other oxycarboxylic acids, polyacrylic acid or methacrylic acid and their salts, sodium tripolyphosphate, sodium hexamethaphosphate, or other condensed phosphates and/or their alkali metal or alkali earth metal salts, etc. may be mainly used.

As hardening adjusters, a hardening retardant or hardening accelerator may be used. As the hardening retardant, boric acid, borax, sodium gluconate, silicon fluoride, etc. may be used. On the other hand, as the hardening accelerator, lithium carbonate or other lithium salts or calcium hydroxide, aluminates, etc. may be used.

Further, it is also possible to use the method of adding Vinylon or other organic fibers, metal aluminum powder, aluminum lactate, and other explosive spalling preventers and raising the porosity of the material.

Further, to improve the fluidity, improve the fillability, and improve the sinterability, it is possible to add ultrafine powder. For example, it may be fumed silica, colloidal silica, reactive alumina, amorphous silica, zircon, silicon carbide, silicon nitride, chrome oxide, titanium oxide, and other inorganic powder of 0.01 to 100 μm or so particle size.

When blending in magnesia or other basic aggregates, cracks sometimes form along with the hydration and expansion of the magnesia. To suppress this, it is preferable to add an additive with a high surface activity such as fumed silica.

Furthermore, to use the binder for monolithic refractories of the present invention to produce a dense hardened object, when kneaded with water, a polycarboxylic acid-based water reducing agent or polyether-based water reducing agent, a lignin-based water reducing agent or other water reducing agent, a high performance water reducing agent, a high performance AE water reducing agent, or other chemical admixture may be used. The types and amounts of addition of these chemical admixtures may be suitably selected by the type or amount of the refractory aggregate mixed, the installation temperature, or other conditions.

As the method of production of the binders for monolithic refractories of the present invention comprised of $Ca_xSr_{1-x}Al_2O_4$, $Ca_ySr_{1-y}Al_4O_7$, and $12(CaO)_z(SrO)_{1-z} \cdot 7Al_2O_3$, the method of using limestone (mainly $CaCO_3$), quick lime (mainly CaO), refined alumina ($\alpha$-$Al_2O_3$, $Al(OH)_3$) or bauxite ($Al_2O_3$ material), strontianite ($SrCO_3$), or celestite ($SrSO_4$) as materials, mixing the materials to give the molar ratio of the binder of the targeted composition, and melting or firing the result in an electric furnace, reverberatory furnace, vertical furnace, or shaft kiln or rotary kiln at a 1100° C. or more, preferably 1300° C. or more, more preferably 1500° C. or more high temperature may be mentioned.

These temperatures and melting and firing times change depend on the volume of the furnace, heating capacity, and other specifications. In practice, it is important to confirm the produced phase of the sample after melting and firing by X-ray diffraction and confirm the formation of the target binder.

Further, when producing a binder comprised of a composition of $Ca_xSr_{1-x}Al_2O_4$ or $12(CaO)_z(SrC)_{1-z} \cdot 7Al_2O_3$, 1300° C. or more is preferable. When producing a binder comprised of a composition of $Ca_ySr_{1-y}Al_4O_7$, a temperature higher than this, for example, a 1500° C. or higher high temperature is preferable for melting or firing. When the phase is not only $Ca_ySr_{1-y}Al_4O_7$, but $Ca_xSr_{1-x}Al_2O_4$ is copresent, a further higher temperature, for example, a 1700° C. or higher high temperature is preferable for melting or firing.

Before the melting or firing, these materials are preferably pulverized by a pulverizer to a 50% average size of 0.5 to 100 μm or so. This is because if including particles coarser than this, a lot of unreacted parts remain and sometimes the inherent effect of the invention is hard to obtain.

Further, after the melting or firing, it is preferable to bring the material into contact with high pressure air or water for cooling to obtain a uniform structure hydraulic material.

Furthermore, the total of the CaO, $Al_2O_3$, and SrO in the material preferably has a high purity of 98 mass % or more. The $TiO_2$, MgO, $Fe_2O_3$, or other impurities contained in the bauxite or barite are liable to lower the physical properties at a high temperature and are preferably as small in amount as possible.

The particle size of the hydraulic material has an effect on the hydration reaction or the hardening rate, so after the melting or firing, it is preferable to use a pulverizer to adjust the size to about 1 to 20 μm. This particle size is the result of measurement by a particle size analyzer using the laser diffraction method, laser scattering method, sedimentation balance method, etc. and expresses the 50% average size. For kneading the material, an Eirich mixer, rotary drum, cone blender, V-type blender, omni mixer, NAUTA mixer, or other mixer may be used for making the mixtures uniform.

As the pulverizer, a vibrating mill, tube mill, ball mill, roller mill, or other industrial use pulverizer may be used.

Further, a binder containing $Ca_xSr_{1-x}Al_2O_4$ in 10 mass % to 60 mass % and having $Al_2O_3$ blended in by an amount of 40 mass % to 90 mass % can be produced by blending $\alpha$-alumina powder to the hydraulic material of $Ca_xSr_{1-x}Al_2O_4$ obtained by the method described above.

$\alpha$-alumina powder is high purity alumina containing $Al_2O_3$ in 90 mass % or more. In general, alumina is produced by the Bayer method. With this method, first the bauxite is washed by a hot solution of sodium hydroxide (NaOH) at 250° C. In this process, the alumina is converted to aluminum hydroxide ($Al(OH)_3$) and is dissolved by a reaction as shown by the following chemical formula:

$$Al_2O_3 + 2OH^- + 3H_2O \rightarrow 2[Al(OH)_4]^-$$

At this time, the other ingredients in the bauxite will not dissolve and can be removed by filtration as solid impurities. If next cooling the solution, the dissolved aluminum hydroxide will precipitate as a white cottony solid. If firing this in a rotary kiln etc. at 1050° C. or more, dehydration occurs as shown below and alumina is produced:

$$2Al(OH)_3 \rightarrow Al_2O_3 + 3H_2O$$

The fluidity as a binder is governed by the specific surface area of the $\alpha$-$Al_2O_3$ blended into the hydraulic material, so the BET specific surface area is preferably 0.1 to 20 m²/g or so.

$\alpha$-$Al_2O_3$ can be prepared as a fine powder in advance or may be mixed and pulverized with the hydraulic material for preparation.

Further, the binders of (4) to (7) may be similarly produced by blending $\alpha$-alumina powder into the ingredients of the respective solid solutions.

EXAMPLES

Below, examples will be used to explain the present invention in further detail, but the present invention is not limited to these examples.

As the materials, purity 99 mass % $CaCO_3$ (made by Ube Materials), purity 98 mass % $SrCO_3$ (made by Sakai Chemical Industry), and purity 99 mass % high purity $\alpha$-alumina (made by Nippon Light Metal) were used.

The materials were weighed by a balance so as to give the chemical compositions of the following Table 1 to Table 14 and were mixed and pulverized by a mortar. 1 mass % of water was added to 100 mass % of the mixed and pulverized material to form granules which were then heat treated in a Siliconit electric furnace at 1400° C. for 48 hours, then lowered in temperature to ordinary temperature and allowed to cool in the air, then pulverized by a ball mill to obtain the hydraulic materials of Example 1 to Example 131.

Furthermore, regarding the examples in which $Al_2O_3$ is blended, the high purity α-alumina (made by Nippon Light Metal) is blended into the obtained hydraulic materials to predetermined ratios.

This binder mass % and refractory aggregate mass % (sieved particle size 1 μm or less sintered alumina 50 mass %, particle size 5 μm to 5 mm fused alumina 43 mass %, magnesia 6 mass %, silica flower 0.8 mass %, Vinylon fiber 0.20 mass %) were mixed by a ratio of 8:92 by an omni mixer for 1 minute to obtain mixtures of the same. Furthermore, in a 20° C. constant temperature chamber, to each mixture as 100 mass %, 6.8 mass % of water was added and the result mixed and kneaded by a mortar mixer to obtain samples of monolithic refractories.

The prepared monolithic refractory samples, 300 g each, were transferred to beakers which were then placed in a constant temperature tank kept at 20° C. Platinum temperature measuring resistors were inserted into the centers of the samples to measure the time required for the hydration exothermic peaks to be reached from the transfer to the constant temperature tank as the hardening time.

Further, the monolithic refractory samples were hardened in a 20° C. constant temperature chamber to prepare 40×40×160 mm refractories which were used for test pieces for evaluation of the erosion resistance to slag at a high temperature.

Figure 2:
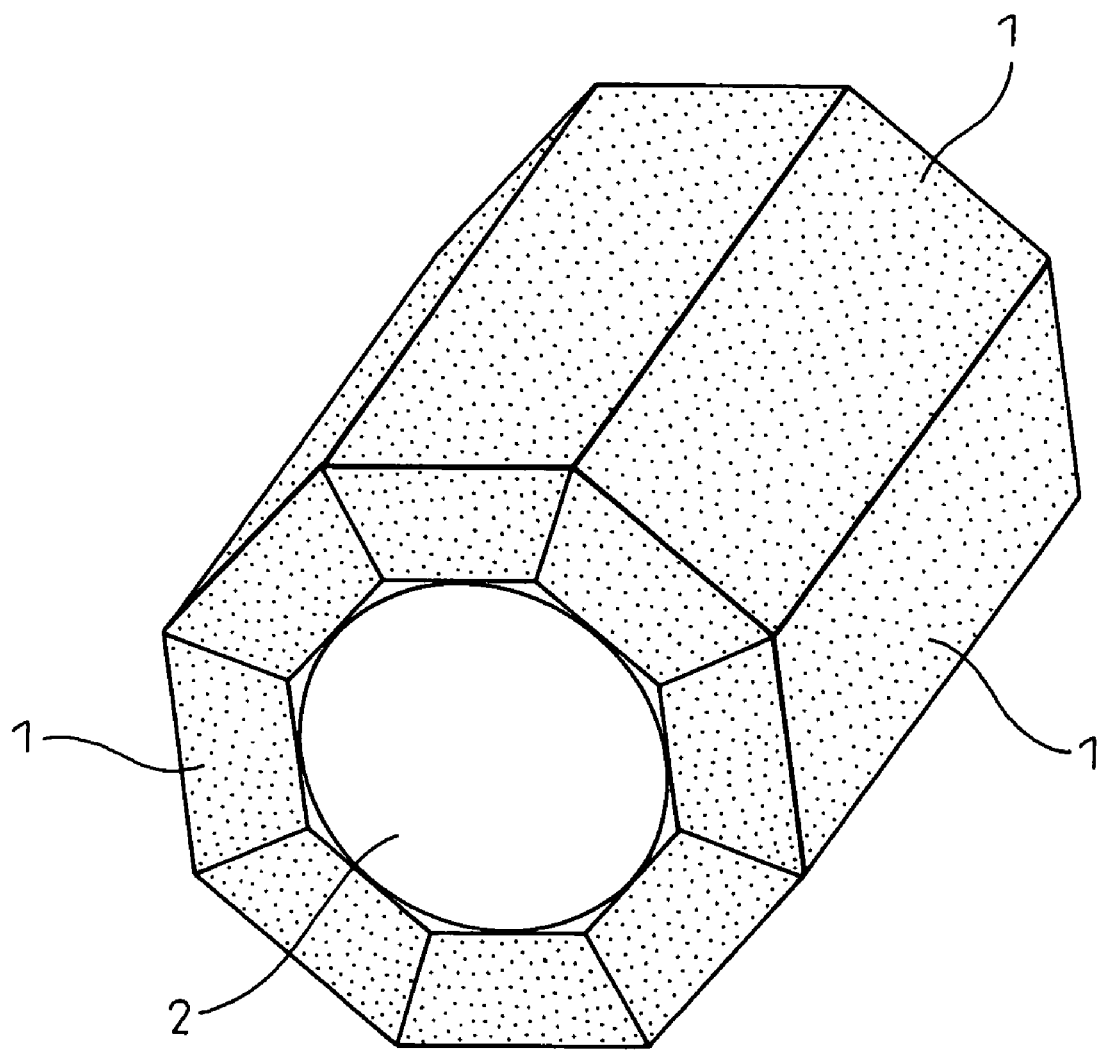
FIG. 2 is an external view of a rotary eroding furnace, 1: refractory (test piece); and 2: protective plate.

The erosion resistance to slag at a high temperature was evaluated by the rotary erosion method. For a rotary furnace, the refractories were cut out into the shape of FIG. 1 to prepare test pieces (refractories 1). Eight refractories 1 were assembled as the inner lining as shown in FIG. 2. The size was made a=67 mm, b=41 mm, c=48 mm, and d=114 mm. Further, at the inside of the eight refractories 1 at the inner lining, a cylindrical protective plate 2 (about 150 mmφ) was assembled.

Figure 3:
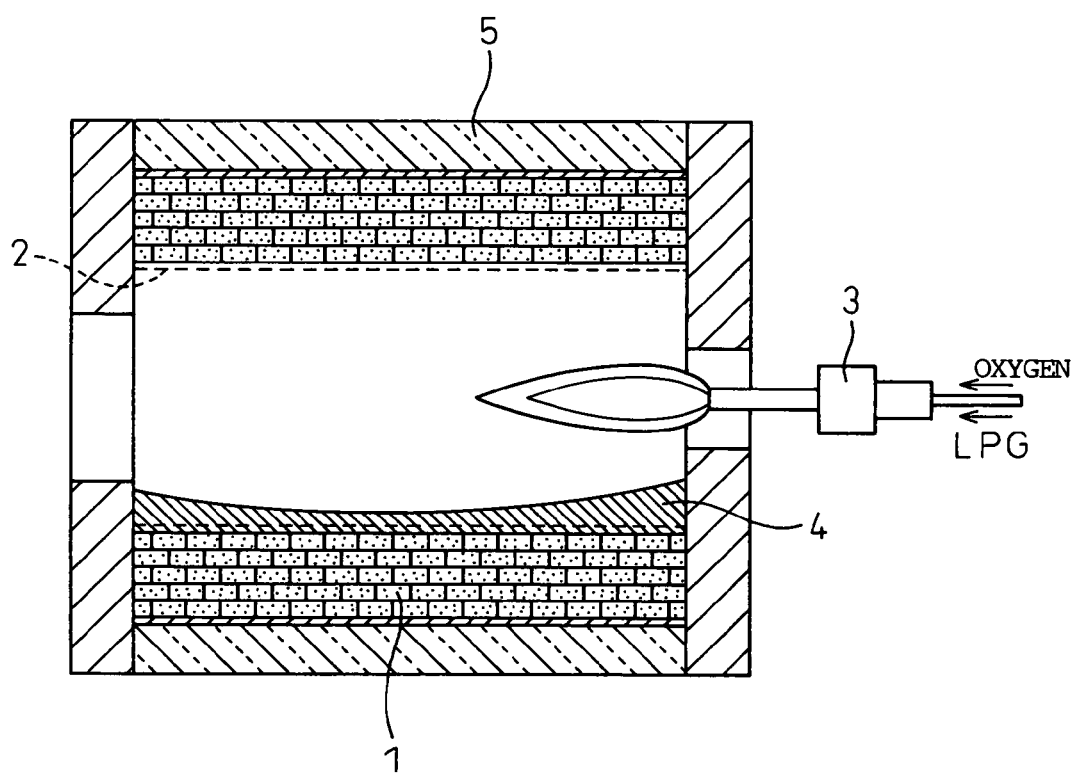
FIG. 3 is an explanatory view showing a cross-section of a rotary eroding furnace 1: refractory (test piece); 2: protective plate; 3: burner; 4: slag; and 5: filler.

The thus assembled refractories 1, as shown in FIG. 3, were set in the rotary furnace. While turning the refractories 1, the temperature was raised by the combustion operation of the burner 3 from the inside of the rotary furnace. As the combustion gas, a mixture of a volume ratio of LPG 1: oxygen 5 was used. Further, 4 indicates the slag, and 5 the filler.

The erosion loss of each test piece was determined by measuring the remaining dimensions at five points every 20 mm interval (in case of thickness of decarburized layer, thickness of nonoxidized layer), calculating the difference from the initial thickness (48 mm), and finding the average. The composition of the slag 4 was made CaO=50.5 mass %, $SiO_2$=16.8 mass %, MgO=7 mass %, $Al_2O_3$=2 mass %, MnO=3.5 mass %, and FeO=20.2 mass %, the test temperature was made 1600° C., 25 minutes were treated as one charge at which the slag 4 was replaced in a 500 g amount, and the test was conducted for a total of six charges for 2 hours 30 minutes. The slag 4 was exchanged by the method of tilting the horizontal drum and discharging it.

[1] Monolithic Refractories Containing Ingredients Comprised of Chemical Compositions of $Ca_xSr_{1-x}Al_2O_4$ Example 3 to Example 5 use monolithic refractories produced using hydraulic materials in which all of the binder ingredients are comprised of chemical compositions of $Ca_xSr_{1-x}Al_2O_4$ (=$(CaO)_x(SrO)_{1-x}\cdot Al_2O_3$), Example 1, Example 2, and Example 6 to Example 14 use monolithic refractories produced using binders in which $Al_2O_3$ is further blended in a predetermined amount, Comparative Example 1 uses monolithic refractories comprised of the binder ingredients without Sr, and Comparative Example 2 uses refractories of the binder ingredients without Ca so as to measure the hardening times and conduct rotary erosion tests using slag. The chemical compositions, measurement results of the hardening times, and results of the rotary erosion test of the examples and comparative examples are shown in Table 1.

TABLE 1

| | | Ex. 1 | Ex. 2 | Ex. 3 | Ex. 4 | Ex. 5 | Ex. 6 |
|---|---|---|---|---|---|---|---|
| Formulation of material (mass %) | $CaCO_3$ | 1.8 | 13.7 | 4.1 | 22.1 | 43.5 | 2.4 |
| | $SrCO_3$ | 2.6 | 20.4 | 54.5 | 32.9 | 7.2 | 32.7 |
| | α-$Al_2O_3$ | 3.6 | 27.9 | 41.4 | 45.0 | 49.3 | 24.8 |
| $(CaO)_x(SrO)_{1-x}\cdot Al_2O_3$ (mass %) | | 8.0 | 62.0 | 100.0 | 100.0 | 100.0 | 60.0 |
| Value of x | | 0.5 | 0.5 | 0.1 | 0.5 | 0.9 | 0.1 |
| $Al_2O_3$ (mass %)* | | 92.0 | 38.0 | 0.0 | 0.0 | 0.0 | 40.0 |
| Hardening time (hr) | | 28 | 10 | 12 | 14 | 11.5 | 15 |
| Rotary erosion test loss (mm) | | 5.0 | 6.0 | 6.1 | 6.1 | 6.5 | 5.9 |

| | | Ex. 7 | Ex. 8 | Ex. 9 | Ex. 10 | Ex. 11 | Ex. 12 |
|---|---|---|---|---|---|---|---|
| Formulation of material (mass %) | $CaCO_3$ | 13.3 | 26.1 | 1.6 | 8.8 | 17.4 | 0.4 |
| | $SrCO_3$ | 19.7 | 4.3 | 21.8 | 13.2 | 2.9 | 5.5 |
| | α-$Al_2O_3$ | 27.0 | 29.6 | 16.6 | 18.0 | 19.7 | 4.1 |
| $(CaO)_x(SrO)_{1-x}\cdot Al_2O_3$ (mass %) | | 60.0 | 60.0 | 40.0 | 40.0 | 40.0 | 10.0 |
| Value of x | | 0.5 | 0.9 | 0.1 | 0.5 | 0.9 | 0.1 |
| $Al_2O_3$ (mass %)* | | 40.0 | 40.0 | 60.0 | 60.0 | 60.0 | 90.0 |
| Hardening time (hr) | | 12 | 16 | 14 | 13.5 | 16 | 17 |
| Rotary erosion test loss (mm) | | 6.0 | 6.1 | 5.7 | 5.7 | 5.8 | 5.2 |

| | | Ex. 13 | Ex. 14 | Comp. Ex. 1 | Comp. Ex. 2 |
|---|---|---|---|---|---|
| Formulation of material (mass %) | $CaCO_3$ | 2.2 | 2.4 | 49.6 | — |
| | $SrCO_3$ | 3.3 | 0.7 | — | 57.0 |
| | α-$Al_2O_3$ | 4.5 | 4.9 | 50.4 | 43.0 |
| $(CaO)_x(SrO)_{1-x}\cdot Al_2O_3$ (mass %) | | 10.0 | 10.0 | 40.0 | 40.0 |
| Value of x | | 0.5 | 0.9 | 1 | 0 |
| $Al_2O_3$ (mass %)* | | 90.0 | 90.0 | 60.0 | 60.0 |
| Hardening time (hr) | | 16 | 16.5 | 24 | 11 |
| Rotary erosion test loss (mm) | | 5.4 | 5.6 | 7.8 | — |

Notes)
*: $Al_2O_3$ other than $(CaO)_x(SrO)_{1-x}\cdot Al_2O_3$.

The results of evaluation, as shown in Table 1, showed that in Example 1 to Example 14, compared with Comparative Example 1, the erosion loss in a rotary erosion test using slag is clearly smaller and the slag resistance at a high temperature is superior.

Further, in Comparative Example 2 produced using a binder not containing Ca, part of the material was hardened in the middle of the kneading, so a homogeneous hardened object could not be obtained. Therefore, the erosion resistance using slag could not be evaluated.

Further, the hardening time was 10 to 28 hours. Usually, it was possible to set a suitable hardening time until the monolithic refractories hardened, strength was expressed, and shape retention could be exhibited.

Further, in Example 1, Example 2, and Example 6 to Example 14, it became clear that by blending in $Al_2O_3$, compared with Example 3 to Example 5, if compared by the same values of x, it was possible to further reduce the erosion loss in the rotary erosion test using slag and that the slag resistance at a high temperature became superior.

[2] Monolithic Refractories Containing Ingredients Comprised of Chemical Compositions of $Ca_ySr_{1-y}Al_4O_7$ Further, the same method as the above was used to obtain hydraulic mixtures where all of the binder ingredients are comprised of chemical compositions of $Ca_ySr_{1-y}Al_4O_7$ (=$(CaO)_y(SrO)_{1-y}\cdot 2Al_2O_3$) and to mix high purity α-alumina (Nippon Light Metal) with the obtained hydraulic materials to give predetermined ingredients.

Example 17 to Example 19 use monolithic refractories produced using hydraulic materials in which all of the binder ingredients are comprised of chemical compositions of $Ca_ySr_{1-y}Al_4O_7$, Example 15, Example 16, and Example 20 to Example 28 use monolithic refractories produced using binders in which $Al_2O_3$ is further blended in a predetermined amount, Comparative Example 3 uses monolithic refractories comprised of the binder ingredients without Sr, and Comparative Example 4 uses monolithic refractories of the binder ingredients without Ca so as to measure the hardening times and conduct rotary erosion tests using slag.

Further, the hardening time was 16 to 29 hours. Usually, it was possible to set a suitable hardening time until the monolithic refractories hardened, strength was expressed, and shape retention could be exhibited.

Further, in Example 15, Example 16, and Example 20 to Example 28, it became clear that by blending in $Al_2O_3$, compared with Example 17 to Example 19, if compared by the same values of x, it was possible to further reduce the erosion loss in the rotary erosion test using slag and the slag resistance at a high temperature became superior.

[3] Monolithic Refractories Containing Mixtures of Chemical Compositions of $Ca_xSr_{1-x}Al_2O_4$ and chemical compositions of $Ca_ySr_{1-y}Al_4O_7$

TABLE 2

|  |  | Ex. 15 | Ex. 16 | Ex. 17 | Ex. 18 | Ex. 19 | Ex. 20 |
|---|---|---|---|---|---|---|---|
| Formulation of material (mass %) | $CaCO_3$ | 1.2 | 11.0 | 2.9 | 15.2 | 29.2 | 2.0 |
|  | $SrCO_3$ | 1.8 | 16.3 | 38.6 | 22.7 | 4.8 | 27.0 |
|  | $\alpha$-$Al_2O_3$ | 5.0 | 44.7 | 58.5 | 62.1 | 66.0 | 41.0 |
| $(CaO)_y(SrO)_{1-y}\cdot 2Al_2O_3$ (mass %) |  | 8.0 | 72.0 | 100.0 | 100.0 | 100.0 | 70.0 |
| Value of x |  | 0.5 | 0.5 | 0.1 | 0.5 | 0.9 | 0.1 |
| $Al_2O_3$ (mass %)* |  | 92.0 | 28.0 | 0.0 | 0.0 | 0.0 | 30.0 |
| Hardening time (hr) |  | 29 | 17 | 17 | 16 | 19 | 20 |
| Rotary erosion test loss (mm) |  | 5.1 | 6.1 | 6.2 | 6.3 | 6.6 | 5.7 |

|  |  | Ex. 21 | Ex. 22 | Ex. 23 | Ex. 24 | Ex. 25 | Ex. 26 |
|---|---|---|---|---|---|---|---|
| Formulation of material (mass %) | $CaCO_3$ | 10.7 | 20.4 | 1.2 | 6.1 | 11.7 | 0.3 |
|  | $SrCO_3$ | 15.9 | 3.4 | 15.4 | 9.1 | 1.9 | 3.8 |
|  | $\alpha$-$Al_2O_3$ | 43.4 | 46.2 | 23.4 | 24.8 | 26.4 | 5.9 |
| $(CaO)_y(SrO)_{1-y}\cdot 2Al_2O_3$ (mass %) |  | 70.0 | 70.0 | 40.0 | 40.0 | 40.0 | 10.0 |
| Value of x |  | 0.5 | 0.9 | 0.1 | 0.5 | 0.9 | 0.1 |
| $Al_2O_3$ (mass %)* |  | 30.0 | 30.0 | 60.0 | 600 | 60.0 | 90.0 |
| Hardening time (hr) |  | 17.5 | 19.5 | 18 | 17.5 | 19.5 | 21 |
| Rotary erosion test loss (mm) |  | 6.0 | 5.8 | 5.9 | 5.6 | 5.8 | 4.9 |

|  |  | Ex. 27 | Ex. 28 | Comp. Ex. 3 | Comp. Ex. 4 |
|---|---|---|---|---|---|
| Formulation of material (mass %) | $CaCO_3$ | 1.5 | 2.9 | 32.9 | — |
|  | $SrCO_3$ | 2.3 | 0.5 | — | 42.2 |
|  | $\alpha$-$Al_2O_3$ | 6.2 | 6.6 | 67.1 | 58.8 |
| $(CaO)_y(SrO)_{1-y}\cdot 2Al_2O_3$ (mass %) |  | 10.0 | 10.0 | 40.0 | 40.0 |
| Value of x |  | 0.5 | 0.9 | 1 | 0 |
| $Al_2O_3$ (mass %)* |  | 90.0 | 90.0 | 60.0 | 60.0 |
| Hardening time (hr) |  | 22.5 | 20.5 | 31 | 14 |
| Rotary erosion test loss (mm) |  | 5.1 | 5.2 | 7.6 | — |

Notes)
*: $Al_2O_3$ other than $(CaO)_y(SrO)_{1-y}\cdot 2Al_2O_3$ (mass %).

The results of evaluation, as shown in Table 2, showed that in Example 15 to Example 28, compared with Comparative Example 3, the erosion loss in a rotary erosion test using slag is clearly smaller and the slag resistance at a high temperature is superior. Further, in Comparative Example 4 produced using a binder not containing Ca, in the same way as Comparative Example 2, a homogeneous hardened object could not be obtained, so the erosion resistance using slag could not be evaluated.

Example 29 to Example 42 use monolithic refractories produced using as binders mixtures comprised of chemical compositions of $Ca_xSr_{1-x}Al_2O_4$ ($=(CaO)_x(SrO)_{1-x}\cdot Al_2O_3$) and chemical compositions of $Ca_ySr_{1-y}Al_4O_7$ ($=(CaO)_y(SrO)_{1-y}\cdot 2Al_2O_3$) for conducting similar tests. The chemical compositions, measurement results of the hardening times, and results of the rotary erosion test of the examples and comparative examples are shown in Table 3.

TABLE 3

|  | Ex. 29 | Ex. 30 | Ex. 31 | Ex. 32 | Ex. 33 | Ex. 34 |
|---|---|---|---|---|---|---|
| $(CaO)_x(SrO)_{1-x}\cdot Al_2O_3$ (mass %) | 4.0 | 31.0 | 90.0 | 50.0 | 10.0 | 54.0 |
| $(CaO)_y(SrO)_{1-y}\cdot 2Al_2O_3$ (mass %) | 4.0 | 31.0 | 10.0 | 50.0 | 90.0 | 6.0 |
| Value of x | 0.5 | 0.5 | 0.5 | 0.5 | 0.5 | 0.5 |
| Value of y | 0.5 | 0.5 | 0.5 | 0.5 | 0.5 | 0.5 |
| $Al_2O_3$ (mass %)* | 92.0 | 38.0 | 0.0 | 0.0 | 0.0 | 40.0 |
| Hardening time (hr) | 27 | 14 | 14 | 16 | 13 | 17 |
| Rotary erosion test loss (mm) | 5.2 | 5.8 | 6.1 | 5.9 | 6.2 | 5.6 |

TABLE 3-continued

|  | Ex. 35 | Ex. 36 | Ex. 37 | Ex. 38 | Ex. 39 | Ex. 40 |
|---|---|---|---|---|---|---|
| $(CaO)_x(SrO)_{1-x} \cdot Al_2O_3$ (mass %) | 30.0 | 6.0 | 36.0 | 20.0 | 4.0 | 9.0 |
| $(CaO)_y(SrO)_{1-y} \cdot 2Al_2O_3$ (mass %) | 30.0 | 54.0 | 4.0 | 20.0 | 36.0 | 1.0 |
| Value of x | 0.5 | 0.5 | 0.5 | 0.5 | 0.5 | 0.5 |
| Value of y | 0.5 | 0.5 | 0.5 | 0.5 | 0.5 | 0.5 |
| $Al_2O_3$ (mass %)* | 40.0 | 40.0 | 60.0 | 60.0 | 60.0 | 90.0 |
| Hardening time (hr) | 14.5 | 17.5 | 16 | 15.5 | 17.5 | 19 |
| Rotary erosion test loss (mm) | 5.8 | 5.8 | 5.8 | 5.6 | 5.7 | 5.4 |

|  | Ex. 41 | Ex. 42 | Comp. Ex. 5 | Comp. Ex. 6 |
|---|---|---|---|---|
| $(CaO)_x(SrO)_{1-x} \cdot Al_2O_3$ (mass %) | 5.0 | 1.0 | 20.0 | 20.0 |
| $(CaO)_y(SrO)_{1-y} \cdot 2Al_2O_3$ (mass %) | 5.0 | 9.0 | 20.0 | 20.0 |
| Value of x | 0.5 | 0.5 | 1 | 0 |
| Value of y | 0.5 | 0.5 | 1 | 0 |
| $Al_2O_3$ (mass %)* | 90.0 | 90.0 | 60.0 | 60.0 |
| Hardening time (hr) | 18 | 18.5 | 22 | 15 |
| Rotary erosion test loss (mm) | 5.6 | 5.2 | 8.1 | — |

Notes)
*: $Al_2O_3$ other than $(CaO)_x(SrO)_{1-x} \cdot Al_2O_3$ and $(CaO)_y(SrO)_{1-y} \cdot 2Al_2O_3$.

The results of evaluation, as shown in Table 3, showed that in Example 29 to Example 42, compared with Comparative Example 5 using a binder not containing Sr, the erosion loss in a rotary erosion test using slag is clearly smaller and the slag resistance at a high temperature is superior.

Further, in Comparative Example 6 using a binder not containing Ca, in the same way as Comparative Example 2, a homogeneous hardened object could not be obtained, so the erosion resistance using slag could not be evaluated.

Further, the hardening time was 13 to 27 hours. Usually, it was possible to set a suitable hardening time until the monolithic refractories hardened, strength was expressed, and shape retention could be exhibited.

Further, in Example 29, Example 30, and Example 34 to Example 42, it became clear that by blending in $Al_2O_3$, compared with Example 31 to Example 33, if compared by the same values of x, y, it was possible to further reduce the erosion loss in the rotary erosion test using slag and the slag resistance at a high temperature became superior.

[4] Monolithic Refractories Containing Mixtures of Chemical Compositions of $Ca_xSr_{1-x}Al_2O_4$ and Chemical Compositions of $12(CaO),(SrO)_{1-z} \cdot 7Al_2O_3$ Furthermore, Example 43 to Example 68 use monolithic refractories produced using as binders mixtures comprised of chemical compositions of $Ca_xSr_{1-x}Al_2O_4(=(CaO)_x(SrO)_{1-x}) \cdot Al_2O_3)$ and chemical compositions of $12(CaO)_z(SrO)_{1-z} \cdot 7Al_2O_3$ for conducting similar tests. The chemical compositions, measurement results of the hardening times, and results of the rotary erosion test of the examples and comparative examples are shown in Table 4 and Table 5.

TABLE 4

|  | Ex. 43 | Ex. 44 | Ex. 45 | Ex. 46 | Ex. 47 | Ex. 48 |
|---|---|---|---|---|---|---|
| $(CaO)_x(SrO)_{1-x} \cdot Al_2O_3$ (mass %) | 7.5 | 57.0 | 99.5 | 99.5 | 99.5 | 95.0 |
| $12(CaO)_z(SrO)_{1-z} \cdot 7Al_2O_3$ (mass %) | 0.5 | 5.0 | 0.5 | 0.5 | 0.5 | 5.0 |
| Value of x | 0.5 | 0.5 | 0.1 | 0.5 | 0.9 | 0.1 |
| Value of z | 0.5 | 0.5 | 0.1 | 0.5 | 0.9 | 0.1 |
| $Al_2O_3$ (mass %)* | 92.0 | 38.0 | 0.0 | 0.0 | 0.0 | 0.0 |
| Hardening time (hr) | 26 | 10 | 11 | 13 | 12 | 10 |
| Rotary erosion test loss (mm) | 5.1 | 5.8 | 6.1 | 6.2 | 6.3 | 6.0 |

|  | Ex. 49 | Ex. 50 | Ex. 51 | Ex. 52 | Ex. 53 | Ex. 54 |
|---|---|---|---|---|---|---|
| $(CaO)_x(SrO)_{1-x} \cdot Al_2O_3$ (mass %) | 95.0 | 95.0 | 59.5 | 59.5 | 59.5 | 55.0 |
| $12(CaO)_z(SrO)_{1-z} \cdot 7Al_2O_3$ (mass %) | 5.0 | 5.0 | 0.5 | 0.5 | 0.5 | 5.0 |
| Value of x | 0.5 | 0.9 | 0.1 | 0.5 | 0.9 | 0.1 |
| Value of z | 0.5 | 0.9 | 0.1 | 0.5 | 0.9 | 0.1 |
| $Al_2O_3$ (mass %)* | 0.0 | 0.0 | 40.0 | 40.0 | 40.0 | 40.0 |
| Hardening time (hr) | 12 | 11 | 15 | 11 | 15 | 14 |
| Rotary erosion test loss (mm) | 5.9 | 6.1 | 5.8 | 5.8 | 6.0 | 5.8 |

|  | Ex. 55 | Ex. 56 | Ex. 57 | Ex. 58 | Ex. 59 | Ex. 60 |
|---|---|---|---|---|---|---|
| $(CaO)_x(SrO)_{1-x} \cdot Al_2O_3$ (mass %) | 55.0 | 55.0 | 39.5 | 39.5 | 39.5 | 35.0 |
| $12(CaO)_z(SrO)_{1-z} \cdot 7Al_2O_3$ (mass %) | 5.0 | 5.0 | 0.5 | 0.5 | 0.5 | 5.0 |
| Value of x | 0.5 | 0.9 | 0.1 | 0.5 | 0.9 | 0.1 |
| Value of z | 0.5 | 0.9 | 0.1 | 0.5 | 0.9 | 0.1 |
| $Al_2O_3$ (mass %)* | 40.0 | 40.0 | 60.0 | 60.0 | 60.0 | 60.0 |
| Hardening time (hr) | 10 | 13 | 14 | 12 | 15 | 13 |
| Rotary erosion test loss (mm) | 5.8 | 6.0 | 5.6 | 5.5 | 5.7 | 5.7 |

Notes)
*: $Al_2O_3$ other than $(CaO)_x(SrO)_{1-x} \cdot Al_2O_3$ and $12(CaO)_z(SrO)_{1-z} \cdot 7Al_2O_3$.

TABLE 5

|  | Ex. 61 | Ex. 62 | Ex. 63 | Ex. 64 | Ex. 65 | Ex. 66 |
|---|---|---|---|---|---|---|
| $(CaO)_x(SrO)_{1-x} \cdot Al_2O_3$ (mass %) | 35.0 | 35.0 | 9.5 | 9.5 | 9.5 | 5.0 |
| $12(CaO)_z(SrO)_{1-z} \cdot 7Al_2O_3$ (mass %) | 5.0 | 5.0 | 0.5 | 0.5 | 0.5 | 5.0 |
| Value of x | 0.5 | 0.9 | 0.1 | 0.5 | 0.9 | 0.1 |
| Value of z | 0.5 | 0.9 | 0.1 | 0.5 | 0.9 | 0.1 |
| $Al_2O_3$ (mass %)* | 60.0 | 60.0 | 90.0 | 90.0 | 90.0 | 90.0 |
| Hardening time (hr) | 11 | 14 | 17 | 15 | 16 | 16 |
| Rotary erosion test loss (mm) | 5.6 | 5.5 | 5.2 | 5.5 | 5.5 | 5.1 |

|  | Ex. 67 | Ex. 68 | Comp. Ex. 7 | Comp. Ex. 8 |
|---|---|---|---|---|
| $(CaO)_x(SrO)_{1-x} \cdot Al_2O_3$ (mass %) | 5.0 | 5.0 | 50.0 | 0.0 |
| $12(CaO)_z(SrO)_{1-z} \cdot 7Al_2O_3$ (mass %) | 5.0 | 5.0 | 50.0 | 10.0 |
| Value of x | 0.5 | 0.9 | 1 | 0 |
| Value of z | 0.5 | 0.9 | 1 | 0 |
| $Al_2O_3$ (mass %)* | 90.0 | 90.0 | 0.0 | 90.0 |
| Hardening time (hr) | 14 | 15 | 0.2 | 0.8 |
| Rotary erosion test loss (mm) | 5.3 | 5.5 | 8.6 | — |

Notes)
*: $Al_2O_3$ other than $(CaO)_x(SrO)_{1-x} \cdot Al_2O_3$ and $12(CaO)_z(SrO)_{1-z} \cdot 7Al_2O_3$.

The results of evaluation, as shown in Table 4 and Table 5, showed that in Example 43 to Example 68, compared with Comparative Example 7 using a binder not containing Sr, the erosion loss in a rotary erosion test using slag is clearly smaller and the slag resistance at a high temperature is superior. Further, in Comparative Example 8 using a binder not containing Ca, in the same way as Comparative Example 2, a homogeneous hardened object could not be obtained, so the erosion resistance using slag could not be evaluated.

Further, the hardening time was 10 to 26 hours. Usually, it was possible to set a suitable hardening time until the monolithic refractories hardened, strength was expressed, and shape retention could be exhibited.

Further, in Example 43, Example 44, and Example 51 to Example 68, it became clear that by blending in $Al_2O_3$, compared with Example 45 to Example 50, if compared by the same values of x and z, it was possible to further reduce the erosion loss in the rotary erosion test using slag and the slag resistance at a high temperature became superior.

[5] Monolithic Refractories Containing Mixtures of Chemical Compositions of $Ca_xSr_{1-x}Al_2O_4$, Chemical Compositions of $12(CaO)_z(SrO)_{1-z} \cdot 7Al_2O_3$, and Chemical Compositions of $Ca_ySr_{1-y}Al_4O_7$ Furthermore, Example 69 to Example 106 use monolithic refractories produced using as binders mixtures comprised of chemical compositions of $Ca_xSr_{1-x}Al_2O_4 (=(CaO)_x(SrO)_{1-x} \cdot Al_2O_3)$, chemical compositions of $12(CaO)_z(SrO)_{1-z} \cdot 7Al_2O_3$, and chemical compositions of $Ca_ySr_{1-y}Al_4O_7 (=(CaO)_y(SrO)_{1-y} \cdot 2Al_2O_3)$ for conducting similar tests. The chemical compositions, measurement results of the hardening times, and results of the rotary erosion test of the examples and comparative examples are shown in Table 6 to Table 9.

TABLE 6

|  | Ex. 69 | Ex. 70 | Ex. 71 | Ex. 72 | Ex. 73 | Ex. 74 |
|---|---|---|---|---|---|---|
| $(CaO)_x(SrO)_{1-x} \cdot Al_2O_3$ (mass %) | 3.75 | 28.5 | 90.0 | 9.5 | 90.0 | 5.0 |
| $(CaO)_y(SrO)_{1-y} \cdot 2Al_2O_3$ (mass %) | 3.75 | 28.5 | 9.5 | 90.0 | 5.0 | 90.0 |
| $12(CaO)_z(SrO)_{1-z} \cdot 7Al_2O_3$ (mass %) | 0.55 | 5 | 0.5 | 0.5 | 5.0 | 5.0 |
| Value of x | 0.5 | 0.5 | 0.5 | 0.5 | 0.5 | 0.5 |
| Value of y | 0.5 | 0.5 | 0.5 | 0.5 | 0.5 | 0.5 |
| Value of z | 0.5 | 0.5 | 0.5 | 0.5 | 0.5 | 0.5 |
| $Al_2O_3$ (mass %)* | 92.0 | 38.0 | 0.0 | 0.0 | 0.0 | 0.0 |
| Hardening time (hr) | 28 | 15 | 15 | 17 | 13 | 15 |
| Rotary erosion test loss (mm) | 5.0 | 5.7 | 6.0 | 5.8 | 6.2 | 5.9 |

|  | Ex. 75 | Ex. 76 | Ex. 77 | Ex. 78 | Ex. 79 | Ex. 80 |
|---|---|---|---|---|---|---|
| $(CaO)_x(SrO)_{1-x} \cdot Al_2O_3$ (mass %) | 54.0 | 5.5 | 49.0 | 6.0 | 34.0 | 5.5 |
| $(CaO)_y(SrO)_{1-y} \cdot 2Al_2O_3$ (mass %) | 5.5 | 54.0 | 6.0 | 49.0 | 5.5 | 34.0 |
| $12(CaO)_z(SrO)_{1-z} \cdot 7Al_2O_3$ (mass %) | 0.5 | 0.5 | 5.0 | 5.0 | 0.5 | 0.5 |
| Value of x | 0.5 | 0.5 | 0.5 | 0.5 | 0.5 | 0.5 |
| Value of y | 0.5 | 0.5 | 0.5 | 0.5 | 0.5 | 0.5 |
| Value of z | 0.5 | 0.5 | 0.5 | 0.5 | 0.5 | 0.5 |
| $Al_2O_3$ (mass %)* | 40.0 | 40.0 | 40.0 | 40.0 | 60.0 | 60.0 |
| Hardening time (hr) | 20 | 21 | 16 | 14 | 16.5 | 15 |
| Rotary erosion test loss (mm) | 5.5 | 5.4 | 5.7 | 5.7 | 5.3 | 5.4 |

Notes)
*: $Al_2O_3$ other than $(CaO)_x(SrO)_{1-x} \cdot Al_2O_3$, $(CaO)_y(SrO)_{1-y} \cdot 2Al_2O_3$, and $12(CaO)_z(SrO)_{1-z} \cdot 7Al_2O_3$.

TABLE 7

|  | Ex. 81 | Ex. 82 | Ex. 83 | Ex. 84 | Ex. 85 | Ex. 86 |
|---|---|---|---|---|---|---|
| $(CaO)_x(SrO)_{1-x} \cdot Al_2O_3$ (mass %) | 29.0 | 6.0 | 5.5 | 4.0 | 4.0 | 1.0 |
| $(CaO)_y(SrO)_{1-y} \cdot 2Al_2O_3$ (mass %) | 6.0 | 29.0 | 4.0 | 5.5 | 1.0 | 4.0 |
| $12(CaO)_z(SrO)_{1-z} \cdot 7Al_2O_3$ (mass %) | 5.0 | 5.0 | 0.5 | 0.5 | 5.0 | 5.0 |
| Value of x | 0.5 | 0.5 | 0.5 | 0.5 | 0.5 | 0.5 |
| Value of y | 0.5 | 0.5 | 0.5 | 0.5 | 0.5 | 0.5 |
| Value of z | 0.5 | 0.5 | 0.5 | 0.5 | 0.5 | 0.5 |
| $Al_2O_3$ (mass %)* | 60.0 | 60.0 | 90.0 | 90.0 | 90.0 | 90.0 |
| Hardening time (hr) | 15.5 | 17 | 20 | 23 | 17 | 19 |
| Rotary erosion test loss (mm) | 5.6 | 5.5 | 5.4 | 5.1 | 5.5 | 5.1 |

|  | Ex. 87 | Ex. 88 | Ex. 89 | Ex. 90 | Ex. 91 | Ex. 92 |
|---|---|---|---|---|---|---|
| $(CaO)_x(SrO)_{1-x} \cdot Al_2O_3$ (mass %) | 90.0 | 90.0 | 90.0 | 90.0 | 90.0 | 90.0 |
| $(CaO)_y(SrO)_{1-y} \cdot 2Al_2O_3$ (mass %) | 9.5 | 9.5 | 9.5 | 9.5 | 9.5 | 9.5 |
| $12(CaO)_z(SrO)_{1-z} \cdot 7Al_2O_3$ (mass %) | 0.5 | 0.5 | 0.5 | 0.5 | 0.5 | 0.5 |
| Value of x | 0.1 | 0.1 | 0.1 | 0.5 | 0.5 | 0.9 |
| Value of y | 0.5 | 0.5 | 0.5 | 0.5 | 0.5 | 0.5 |
| Value of z | 0.1 | 0.5 | 0.9 | 0.1 | 0.9 | 0.1 |
| $Al_2O_3$ (mass %)* | 0.0 | 0.0 | 0.0 | 0.0 | 0.0 | 0.0 |
| Hardening time (hr) | 16 | 15 | 14 | 17 | 15 | 17.5 |
| Rotary erosion test loss (mm) | 6.1 | 6.0 | 6.1 | 6.0 | 6.0 | 6.1 |

Notes)
*: $Al_2O_3$ other than $(CaO)_x(SrO)_{1-x} \cdot Al_2O_3$, $(CaO)_y(SrO)_{1-y} \cdot 2Al_2O_3$, and $12(CaO)_z(SrO)_{1-z} \cdot 7Al_2O_3$.

TABLE 8

|  | Ex. 93 | Ex. 94 | Ex. 95 | Ex. 96 | Ex. 97 | Ex. 98 |
|---|---|---|---|---|---|---|
| $(CaO)_x(SrO)_{1-x} \cdot Al_2O_3$ (mass %) | 90.0 | 90.0 | 90.0 | 90.0 | 4.0 | 4.0 |
| $(CaO)_y(SrO)_{1-y} \cdot 2Al_2O_3$ (mass %) | 9.5 | 9.5 | 9.5 | 9.5 | 5.5 | 5.5 |
| $12(CaO)_z(SrO)_{1-z} \cdot 7Al_2O_3$ (mass %) | 0.5 | 0.5 | 0.5 | 0.5 | 0.5 | 0.5 |
| Value of x | 0.9 | 0.9 | 0.9 | 0.1 | 0.1 | 0.1 |
| Value of y | 0.5 | 0.5 | 0.1 | 0.9 | 0.5 | 0.5 |
| Value of z | 0.5 | 0.9 | 0.5 | 0.9 | 0.1 | 0.5 |
| $Al_2O_3$ (mass %)* | 0.0 | 0.0 | 0.0 | 0.0 | 90.0 | 90.0 |
| Hardening time (hr) | 17 | 16 | 17 | 16 | 23 | 22 |
| Rotary erosion test loss (mm) | 5.9 | 6.0 | 6.0 | 5.9 | 5.2 | 5.0 |

|  | Ex. 99 | Ex. 100 | Ex. 101 | Ex. 102 | Ex. 103 | Ex. 104 |
|---|---|---|---|---|---|---|
| $(CaO)_x(SrO)_{1-x} \cdot Al_2O_3$ (mass %) | 4.0 | 4.0 | 4.0 | 4.0 | 4.0 | 4.0 |
| $(CaO)_y(SrO)_{1-y} \cdot 2Al_2O_3$ (mass %) | 5.5 | 5.5 | 5.5 | 5.5 | 5.5 | 5.5 |
| $12(CaO)_z(SrO)_{1-z} \cdot 7Al_2O_3$ (mass %) | 0.5 | 0.5 | 0.5 | 0.5 | 0.5 | 0.5 |
| Value of x | 0.1 | 0.5 | 0.5 | 0.9 | 0.9 | 0.9 |
| Value of y | 0.5 | 0.5 | 0.5 | 0.5 | 0.5 | 0.5 |
| Value of z | 0.9 | 0.1 | 0.9 | 0.1 | 0.5 | 0.9 |
| $Al_2O_3$ (mass %)* | 90.0 | 90.0 | 90.0 | 90.0 | 90.0 | 90.0 |
| Hardening time (hr) | 21.5 | 23.5 | 22 | 24 | 23.5 | 23 |
| Rotary erosion test loss (mm) | 5.4 | 5.3 | 5.2 | 5.2 | 5.0 | 5.1 |

Notes)
*: $Al_2O_3$ other than $(CaO)_x(SrO)_{1-x} \cdot Al_2O_3$, $(CaO)_y(SrO)_{1-y} \cdot 2Al_2O_3$, and $12(CaO)_z(SrO)_{1-z} \cdot 7Al_2O_3$.

TABLE 9

|  | Ex. 105 | Ex. 106 | Comp. Ex. 9 | Comp. Ex. 10 |
|---|---|---|---|---|
| $(CaO)_x(SrO)_{1-x} \cdot Al_2O_3$ (mass %) | 4.0 | 4.0 | 15.0 | 5.0 |
| $(CaO)_y(SrO)_{1-y} \cdot 2Al_2O_3$ (mass %) | 5.5 | 5.5 | 15.0 | 5.0 |
| $12(CaO)_z(SrO)_{1-z} \cdot 7Al_2O_3$ (mass %) | 0.5 | 0.5 | 10.0 | 30.0 |
| Value of x | 0.9 | 0.1 | 1 | 0 |
| Value of y | 0.1 | 0.9 | 1 | 0 |
| Value of z | 0.5 | 0.9 | 1 | 0 |
| $Al_2O_3$ (mass %)* | 90.0 | 90.0 | 60.0 | 60.0 |
| Hardening time (hr) | 24 | 23 | 0.9 | 0.5 |
| Rotary erosion test loss (mm) | 5.1 | 5.0 | 7.3 | — |

Notes)
*: $Al_2O_3$ other than $(CaO)_x(SrO)_{1-x} \cdot Al_2O_3$, $(CaO)_y(SrO)_{1-y} \cdot 2Al_2O_3$, and $12(CaO)_z(SrO)_{1-z} \cdot 7Al_2O_3$.

The results of evaluation, as shown in Table 6 to Table 9, showed that in Example 69 to Example 106, compared with Comparative Example 9 using a binder not containing Sr, the erosion loss in a rotary erosion test using slag is clearly smaller and the slag resistance at a high temperature is superior. Further, in Comparative Example 10 using a binder not containing Ca, in the same way as Comparative Example 2, a homogeneous hardened object could not be obtained, so the erosion resistance using slag could not be evaluated.

Further, the hardening time was 13 to 28 hours. Usually, it was possible to set a suitable hardening time until the monolithic refractories hardened, strength was expressed, and shape retention could be exhibited.

Further, in Example 69, Example 70, Example 75 to Example 86, and Example 97 to Example 106, it became clear that by blending in $Al_2O_3$, compared with Example 71 to Example 74 and Example 87 to Example 96, if compared by the same values of x, y, and z, it was possible to further reduce the erosion loss in the rotary erosion test using slag and the slag resistance at a high temperature became superior.

[6] Monolithic Refractories Containing Ingredients of Chemical Compositions of $Ca_xSr_{1-x}Al_2O_4$ Next, the inventors studied the mixing ratio of the refractory aggregate and the binder. Example 107 to Example 109 are cases of monolithic refractories produced using binders comprised of chemical compositions of $Ca_xSr_{1-x}Al_2O_4 (= (CaO)_x(SrO)_{1-x}).Al_2O_3$) into which further predetermined amounts of $Al_2O_3$ were blended wherein the amounts of the binders when indexed to the totals of the binders and refractory aggregates as 100 mass % are 0.5 mass %, 5 mass %, and 10 mass %. Example 110 is the case of an amount of binder of 0.2 mass %, while Example 111 is the case of an amount of binder of 15 mass %. Using these, the bending strengths after 24-hour hardening were measured and rotary erosion tests using slag were performed. The chemical compositions, measurement results of the bending strength after 24-hour hardening, and results of the rotary erosion test of the examples and comparative examples are shown in Table 10. Examples 107 to 109 with amounts of binders of 0.5 mass %, 5 mass %, and 10 mass % could give sufficient strength after 24-hour hardening, while Example 110 with an amount of binder of 0.2 mass % was low in strength after 24-hour hardening. Further, Example 111 with an amount of binder of 15 mass % could give a strength after 24-hour hardening of a high value, but it was clear that the slag resistance at a high temperature dropped.

TABLE 10

| | | Ex. 107 | Ex. 108 | Ex. 109 | Ex. 110 | Ex. 111 |
|---|---|---|---|---|---|---|
| Formulation of material (mass %) | $CaCO_3$ | 17.4 | 17.4 | 17.4 | 17.4 | 17.4 |
| | $SrCO_3$ | 2.9 | 2.9 | 2.9 | 2.9 | 2.9 |
| | $\alpha\text{-}Al_2O_3$ | 19.7 | 19.7 | 19.7 | 19.7 | 19.7 |
| $(CaO)_x(SrO)_{1-x}\bullet Al_2O_3$ (mass %) | | 40 | 40 | 40 | 40 | 40 |
| Value of X | | 0.9 | 0.9 | 0.9 | 0.9 | 0.9 |
| $Al_2O_3$ (mass %)* | | 60 | 60 | 60 | 60 | 60 |
| Amount of binder (mass %)** | | 0.5 | 5 | 10 | 0.2 | 15 |
| Bending strength after 24-hour hardening (MPa) | | 2 | 2.2 | 2.3 | 1.2 | 2.4 |
| Rotary erosion test loss (mm) | | 5.8 | 5.9 | 6.2 | 5.9 | 6.5 |

Notes)
*: $Al_2O_3$ other than $(CaO)_x(SrO)_{1-x}\bullet Al_2O_3$.
**: Value when indexed to total of binder and refractory aggregate as 100 mass %.

[7] Monolithic Refractories Containing Ingredients of Chemical Compositions of $Ca_ySr_{1-y}Al_4O_7$ Example 112 to Example 114 are cases of monolithic refractories produced using binders comprised of chemical compositions of $Ca_ySr_{1-y}Al_4O_7 (=(CaO)_y(SrO)_{1-y}.2Al_2O_3)$ into which further predetermined amounts of $Al_2O_3$ were blended wherein the amounts of the binders when indexed to the totals of the binders and refractory aggregates as 100 mass % are 0.5 mass %, 5 mass %, and 10 mass %. Example 115 is the case of an amount of binder of 0.2 mass %, while Example 116 is the case of an amount of binder of 15 mass %. Using these, the bending strengths after 24-hour hardening were measured and rotary erosion tests using slag were performed. The chemical compositions, measurement results of the bending strength after 24-hour hardening, and results of the rotary erosion test of the examples and comparative examples are shown in Table 11. Examples 112 to 114 with amounts of binders of 0.5 mass %, 5 mass %, and 10 mass % could give sufficient strength after 24-hour hardening, while Example 115 with an amount of binder of 0.2 mass % was low in strength after 24-hour hardening. Further, Example 116 with an amount of binder of 15 mass % could give a strength after 24-hour hardening of a high value, but it was clear that the slag resistance at a high temperature dropped.

TABLE 11

| | | Ex. 112 | Ex. 113 | Ex. 114 | Ex. 115 | Ex. 116 |
|---|---|---|---|---|---|---|
| Formulation of material (mass %) | $CaCO_3$ | 11.7 | 11.7 | 11.7 | 11.7 | 11.7 |
| | $SrCO_3$ | 1.9 | 1.9 | 1.9 | 1.9 | 1.9 |
| | $\alpha\text{-}Al_2O_3$ | 26.4 | 26.4 | 26.4 | 26.4 | 26.4 |
| $(CaO)_x(SrO)_{1-x}\bullet 2Al_2O_3$ (mass %) | | 40 | 40 | 40 | 40 | 40 |
| Value of X | | 0.9 | 0.9 | 0.9 | 0.9 | 0.9 |
| $Al_2O_3$ (mass %)* | | 60 | 60 | 60 | 60 | 60 |
| Amount of binder (mass %)** | | 0.5 | 5 | 10 | 0.2 | 15 |
| Bending strength after 24-hour hardening (MPa) | | 1.7 | 1.8 | 1.9 | 0.8 | 2 |
| Rotary erosion test loss (mm) | | 5.6 | 5.7 | 6.0 | 5.9 | 6.4 |

Notes)
*: $Al_2O_3$ other than $(CaO)_x(SrO)_{1-x}\bullet 2Al_2O_3$.
**: Value when indexed to total of binder and refractory aggregate as 100 mass %.

[8] Monolithic Refractories Containing Mixtures of Chemical Compositions of $Ca_xSr_{1-x}Al_2O_4$ and Chemical Compositions of $Ca_ySr_{1-y}Al_4O_7$ Example 117 to Example 119 are cases of monolithic refractories produced using binders comprised of mixtures of chemical compositions of $Ca_xSr_{1-x}Al_2O_4 (=(CaO)_x(SrO)_{1-x}.Al_2O_3)$ and chemical compositions of $Ca_ySr_{1-y}Al_4O_7 (=(CaO)_y(SrO)_{1-y}.2Al_2O_3)$ into which further predetermined amounts of $Al_2O_3$ were blended wherein the amounts of the binders when indexed to the totals of the binders and refractory aggregates as 100 mass % are 0.5 mass %, 5 mass %, and 10 mass %. Example 120 is the case of an amount of binder of 0.2 mass %, while Example 121 is the case of an amount of binder of 15 mass %. Using these, the bending strengths after 24-hour hardening were measured and rotary erosion tests using slag were performed. The chemical compositions, measurement results of the bending strength after 24-hour hardening, and results of the rotary erosion test of the examples and comparative examples are shown in Table 12. Examples 117 to 119 with amounts of binders of 0.5 mass %, 5 mass %, and 10 mass % could give sufficient strength after 24-hour hardening, while Example 120 with an amount of binder of 0.2 mass % was low in strength after 24-hour hardening. Further, Example 121 with an amount of binder of 15 mass % could give a strength after 24-hour hardening of a high value, but it was clear that the slag resistance at a high temperature dropped.

TABLE 12

| | Ex. 117 | Ex. 118 | Ex. 119 | Ex. 120 | Ex. 121 |
|---|---|---|---|---|---|
| $(CaO)_x(SrO)_{1-x}\bullet Al_2O_3$ (mass %) | 20 | 20 | 20 | 20 | 20 |
| $(CaO)_y(SrO)_{1-y}\bullet 2Al_2O_3$ (mass %) | 20 | 20 | 20 | 20 | 20 |
| Value of X | 0.5 | 0.5 | 0.5 | 0.5 | 0.5 |
| Value of Z | 0.5 | 0.5 | 0.5 | 0.5 | 0.5 |
| $Al_2O_3$ (mass %)* | 60 | 60 | 60 | 60 | 60 |
| Amount of binder (mass %)** | 0.5 | 5 | 10 | 0.2 | 15 |
| Bending strength after 24-hour hardening (MPa) | 1.8 | 1.8 | 2.0 | 1.1 | 2.1 |
| Rotary erosion test loss (mm) | 5.8 | 5.6 | 6.1 | 5.8 | 6.6 |

Notes)
*: $Al_2O_3$ other than $(CaO)_x(SrO)_{1-x}\bullet Al_2O_3$ and $(CaO)_x(SrO)_{1-x}\bullet 2Al_2O_3$.
**: Value when indexed to total of binder and refractory aggregate as 100 mass %.

[9] Monolithic Refractories Containing Mixtures of Chemical Compositions of $Ca_xSr_{1-x}Al_2O_4$ and Chemical Compositions of $12(CaO)_z(SrO)_{1-z}\cdot 7Al_2O_3$ Example 122 to Example 124 are cases of monolithic refractories produced using binders comprised of mixtures of chemical compositions of $Ca_xSr_1$-$Al_2O_4$ and chemical compositions of $12(CaO)_z(SrO)_{1-z}\cdot 7Al_2O_3$ into which further predetermined amounts of $Al_2O_3$ were blended wherein the amounts of the binders when indexed to the totals of the binders and refractory aggregates as 100 mass % are 0.5 mass %, 5 mass %, and 10 mass %. Example 125 is the case of an amount of binder of 0.2 mass %, while Example 126 is the case of an amount of binder of 15 mass %. Using these, the bending strengths after 24-hour hardening were measured and rotary erosion tests using slag were performed. The chemical compositions, measurement results of the bending strength after 24-hour hardening, and results of the rotary erosion test of the examples and comparative examples are shown in Table 13. Examples 122 to 124 with amounts of binders of 0.5 mass %, 5 mass %, and 10 mass % could give sufficient strength after 24-hour hardening, while Example 125 with an amount of binder of 0.2 mass % was low in strength after 24-hour hardening. Further, Example 136 with an amount of binder of 15 mass % could give a strength after 24-hour hardening of a high value, but it was clear that the slag resistance at a high temperature dropped.

TABLE 13

|  | Ex. 122 | Ex. 123 | Ex. 124 | Ex. 125 | Ex. 126 |
|---|---|---|---|---|---|
| $(CaO)_x(SrO)_{1-x}\cdot Al_2O_3$ (mass %) | 35 | 35 | 35 | 35 | 35 |
| $12(CaO)_z(SrO)_{1-z}\cdot 7Al_2O_3$ (mass %) | 5 | 5 | 5 | 5 | 5 |
| Value of X | 0.5 | 0.5 | 0.5 | 0.5 | 0.5 |
| Value of Z | 0.5 | 0.5 | 0.5 | 0.5 | 0.5 |
| $Al_2O_3$ (mass %)* | 60 | 60 | 60 | 60 | 60 |
| Amount of binder (mass %)** | 0.5 | 5 | 10 | 0.2 | 15 |
| Bending strength after 24-hour hardening (MPa) | 1.9 | 2.1 | 2.2 | 1.1 | 2.3 |
| Rotary erosion test loss (mm) | 5.6 | 5.7 | 5.9 | 5.9 | 6.2 |

Notes)
*: $Al_2O_3$ other than $(CaO)_x(SrO)_{1-x}\cdot Al_2O_3$ and $12(CaO)_x(SrO)_{1-x}\cdot 7Al_2O_3$.
**: Value when indexed to total of binder and refractory aggregate as 100 mass %.

[10] Monolithic Refractories Containing Mixtures of Chemical Compositions of $Ca_xSr_{1-x}Al_2O_4$, Chemical Compositions of $12(CaO)_z(SrO)_{1-z}\cdot 7Al_2O_3$, and Chemical Compositions of $Ca_ySr_{1-y}Al_4O_7$ Example 127 to Example 129 are cases of monolithic refractories produced using binders comprised of mixtures of chemical compositions of $Ca_xSr_{1-x}Al_2O_4$, chemical compositions of $12(CaO)_z(SrO)_{1-z}\cdot 7Al_2O_3$, and chemical compositions of $Ca_ySr_{1-y}Al_4O_7$ into which further predetermined amounts of $Al_2O_3$ were blended wherein the amounts of the binders when indexed to the totals of the binders and refractory aggregates as 100 mass % are 0.5 mass %, 5 mass %, and 10 mass %. Example 130 is the case of an amount of binder of 0.2 mass %, while Example 131 is the case of an amount of binder of 15 mass %. Using these, the bending strengths after 24-hour hardening were measured and rotary erosion tests using slag were performed. The chemical compositions, measurement results of the bending strength after 24-hour hardening, and results of the rotary erosion test of the examples and comparative examples are shown in Table 14. Examples 127 to 129 with amounts of binder of 0.5 mass %, 5 mass %, and 10 mass % could give sufficient strength after 24-hour hardening, while Example 130 with an amount of binder of 0.2 mass % had a low strength after 24-hour hardening. Further, Example 131 with an amount of binder of 15 mass % could give a strength after 24-hour hardening of a high value, but it was clear that the slag resistance at a high temperature dropped.

TABLE 14

|  | Ex. 127 | Ex. 128 | Ex. 129 | Ex. 130 | Ex. 131 |
|---|---|---|---|---|---|
| $(CaO)_x(SrO)_{1-x}\cdot Al_2O_3$ (mass %) | 29 | 29 | 29 | 29 | 29 |
| $(CaO)_x(SrO)_{1-x}\cdot 2Al_2O_3$ (mass %) | 6 | 6 | 6 | 6 | 6 |
| $12(CaO)_z(SrO)_{1-x}\cdot 7Al_2O_3$ (mass %) | 5 | 5 | 5 | 5 | 5 |
| Value of X | 0.5 | 0.5 | 0.5 | 0.5 | 0.5 |
| $Al_2O_3$ (mass %)* | 60 | 60 | 60 | 60 | 60 |
| Amount of binder (mass %)** | 0.5 | 5 | 10 | 0.2 | 15 |
| Bending strength after 24-hour hardening (MPa) | 1.9 | 1.9 | 2.1 | 0.9 | 2.1 |
| Rotary erosion test loss (mm) | 5.6 | 5.8 | 5.8 | 5.9 | 6.3 |

Notes)
*: $Al_2O_3$ other than $(CaO)_x(SrO)_{1-x}\cdot Al_2O_3$, $(CaO)_x(SrO)_{1-x}\cdot 2Al_2O_3$, and $12(CaO)_x(SrO)_{1-x}\cdot 7Al_2O_3$.
**: Value when indexed to total of binder and refractory aggregate as 100 mass %.

In this way, it was clear that in all of the examples, the slag resistance at 1600° C. was better than the comparative examples and the durability at parts contacting the molten iron or slag was improved.

| EXPLANATION OF REFERENCES | |
|---|---|
| 1 | refractory (test piece) |
| 2 | protective plate |
| 3 | burner |
| 4 | slag |
| 5 | filler |

The invention claimed is:

1. A binder for monolithic refractories, comprising $Ca_xSr_{1-x}Al_2O_4$, $Ca_ySr_{1-y}Al_4O_7$, and $Al_2O_3$ in a blend comprising $Ca_xSr_{1-x}Al_2O_4$ and $Ca_ySr_{1-y}Al_4O_7$ together in a total amount ranging from 10 mass % to 60 mass % and $Al_2O_3$ in an amount ranging from 40 mass % to 90 mass %, wherein $0<x<1$ and $0<y<1$.

2. A binder for monolithic refractories, comprising $Ca_xSr_{1-x}Al_2O_4$, $12(CaO)_z(SrO)_{1-z}\cdot 7Al_2O_3$, and $Al_2O_3$ in a blend comprising $Ca_xSr_{1-x}Al_2O_4$ and $12(CaO)_z(SrO)_{1-z}\cdot 7Al_2O_3$ together in a total amount ranging from 10 mass % to 60 mass % and $Al_2O_3$ in an amount ranging from 40 mass % to 90 mass %, wherein $0<x<1$ and $0<z<1$.

3. A binder for monolithic refractories, comprising $Ca_xSr_{1-x}Al_2O_4$, $Ca_ySr_{1-y}Al_4O_7$, $12(CaO)_z(SrO)_{1-z}\cdot 7Al_2O_3$, and $Al_2O_3$ in a blend comprising $Ca_xSr_{1-x}Al_2O_4$, $Ca_ySr_{1-y}Al_4O_7$ and $12(CaO)_z(SrO)_{1-z}\cdot 7Al_2O_3$ together in a total amount ranging from 10 mass % to 60 mass % and $Al_2O_3$ in an amount ranging from 40 mass % to 90 mass %, wherein $0<x<1$, $0<y<1$, and $0<z<1$.

4. A binder for monolithic refractories, consisting of $Ca_xSr_{1-x}Al_2O_4$ and $Ca_ySr_{1-y}Al_4O_7$, wherein $0<x<1$ and $0<y<1$.

5. A binder for monolithic refractories, consisting of $Ca_xSr_{1-x}Al_2O_4$ and $12(CaO)_z(SrO)_{1-z}\cdot 7Al_2O_3$, wherein $0<x<1$ and $0<z<1$.

6. A binder for monolithic refractories, consisting of $Ca_xSr_{1-x}Al_2O_4$, $Ca_ySr_{1-y}Al_4O_7$, and $12(CaO)_z(SrO)_{1-z}\cdot 7Al_2O_3$, wherein $0<x<1$, $0<y<1$, and $0<z<1$.

* * * * *